United States Patent Office 3,773,788
Patented Nov. 20, 1973

3,773,788
METHOD FOR THE PREPARATION OF N-(SUBSTI-
TUTED PHENYL)-2-IMINOPYRROLIDINES
Jan H. Vis, Shaker Heights, Ohio, assignor to The
Standard Oil Company, Cleveland, Ohio
No Drawing. Continuation of abandoned application Ser.
No. 4,786, Jan. 21, 1970. This application Nov. 26,
1971, Ser. No. 202,566
Int. Cl. C07d 27/04
U.S. Cl. 260—326.85                                          5 Claims

ABSTRACT OF THE DISCLOSURE

A simple method for the manufacture of N-(substituted phenyl)-2-iminopyrrolidines.

CROSS REFERENCE TO RELATED APPLICATION

This is a continuation of my application Ser. No. 4,786 filed Jan. 21, 1970, now abandoned.

BACKGROUND OF THE INVENTION

The compound prepared by the instant method are useful ignitability compounds in gasoline internal combustion engines as well as corrosion inhibitors for aqueous glycol compositions.

Synthesis of N-substituted 2-iminopyrrolidines has been reported by Bredereck (Ber., 94, 2278, 1961) and Etienne et al. (Comp. Rend. Acad. Sci., 259, 2660, 1964) which require pyrrolidone or N-substituted pyrrolidones as starting materials. More recently, Kwok et al. (J. Org. Chem. 32, 738–40, 1967) have disclosed syntheses starting from 4-chlorobutyronitrile and a variety of primary amines. As they point out, all the reactions are exothermic, after the initial heating.

A peculiarity of the Kwok reaction as outlined in Scheme 1 of the reference is that when aniline is reacted with 4-chlorobutyronitrile, no mono-substituted product can be obtained. This is impliedly confirmed by the disclosure that "To obtain 1-phenyl-2-iminopyrrolidine (IIe), 4-chlorobutyronitrile was refluxed with N-methylaniline. There was no amine exchange owing to the fact that secondary amine was used" (bottom of Col. 2, page 1). It will be noted that in N-methylaniline the substitution is not on the phenyl ring. Another peculiarity of the Kwok reaction, with the disclosed substituents, is that the reactions, once started by heating, go to completion smoothly and cleanly, without the formation of by-products, making recovery of the pure products a simple task.

It has been discovered that N-(substituted phenyl), 2-iminopyrrolidines are singularly effective as corrosion inhibitors in aqueous glycol solutions and as ignitability additives in gasoline internal combustion engines. It was assumed that these compounds could be prepared by a method substantially the same as that disclosed by Kwok. However, quite unexpectedly, it was found that the majority of the desired compounds would not form under the conditions disclosed by Kwok, while a few reacted with such violence that the reaction product was a charred mass of tarry product. It became necessary to develop a new method for the preparation of the N-(substituted phenyl)-2-iminopyrrolidines.

It has been discovered that mono-substituted 1-phenyl, 2-iminopyrrolidines can be obtained provided at least one substituent is inserted into the aromatic ring. It does not appear to matter what the substituent is since alkyl groups having from 1 to 5 carbon atoms, nitro- and halo-substituents, all give rise to the mono-substituted product, without substantial formation of the di-substituted product.

SUMMARY OF THE INVENTION

It is an object of the instant invention to provide a method for the preparation of N-(substituted phenyl)-2-iminopyrrolidines from 4-chlorobutyronitrile and a substituted aryl amine.

It is another object to provide a method for the preparation of substantially pure N-(halo- and nitro-substituted phenyl) 2-iminopyrrolidines by removal of contaminants from the reaction product.

PREFERRED EMBODIMENT OF THE INSTANT INVENTION

It has been noted that there is no certain method of predicting which of the substituted aryl amines used as reactants will give rise to a reaction that proceeds with extreme vigor, or in accordance with the Kwok reaction, or not at all. Suffice to say that since it has been found that many compounds, incapable of being formed as disclosed by Kwok, are very good corrosion inhibitors and ignitability additives, it was necessary to devise a process for making them.

The corrosion inhibition of the instant compounds in aqueous glycol solutions was determined by dissolving from .001 to about 5.0 percent by weight of inhibitor based on glycol content of the solution in contact with metal. The glycol content of the aqueous solution may be in the range of 10 to 90 percent by weight glycol. Metals and alloys on which the instant compounds are specifically effective are aluminum and copper, steel, brass and solder, material commonly used for liquid-gas heat exchanges.

The following examples illustrate the method of the instant invention.

Example 1.—Preparation of N-(2,6-dichlorophenyl)-2-iminopyrrolidine which proceeds only upon continuous refluxing 5.1 g. (0.05 mole) 4-chlorobutyronitrile and 8.1 g. (0.05 mole) 2,6-dichloroaniline are heated to reflux for two hours. No visible exothermic reaction takes place. The mixture is subsequently allowed to cool to room temperature and extracted with 100 ml. benzene and 100 ml. $H_2O$. The $H_2O$ layer, containing the HCl salt of the 2-iminopyrrolidine, is refluxed for one-half hour with 1 g. Norit® [1], filtered, and treated with excess NaOH. An oily layer is formed, which is twice extracted with 100 ml. benzene. The combined benzene layers are dried over anhydrous $MgSO_4$. Evaporation of benzene gives 3.0 g. (25 percent) N-(2,6-dichlorophenyl)-2-iminopyrrolidine as white crystals, with a melting point of 104.8° C. (from ligroin). Analysis of its HCl salt:

Calculated (percent): C, 45.25; H, 4.14; N, 10.54; Cl, 13.36. Found (percent): C, 44.92; H, 417; N, 11.03; Cl, 13.41.

Example 2—Preparation of N-(3-nitrophenyl)-2-iminopyrrolidine which must be interrupted and cooled A mixture of 5.1 g. (0.05 mole) 4-chlorobutylronitrile and 6.9 g. (0.05 mole) 3-nitroaniline is heated carefully to ±200° C. At this temperature an exothermic reaction begins, which is immediately interrupted by removing the heat source. After the reaction has subsided, this process of heating and interrupting is repeated three times until most of the mixture stays solid at ~150° C.

The working-up procedure is identical to that described in Example 1. Yield 5 g. (46 percent) yellow crystals, with a melting point of 109.7° C. (from benzene). Analysis of its HCl salt:

[1] Norit® brand active carbon is a commercially available active carbon.

Calculated (percent): C, 49.69; H, 4.97; N, 17.39; Cl, 14.70. Found (percent): C, 49.08; H, 4.63; N, 16.71 Cl, 14.01.

A list of some compounds which fall in the category of Example 1 is found in Column A of Table I, and some compounds which fall in the category of Example 2 are listed in Column B Corrosion tests, utilizing compounds prepared by the instant method were carried out as follows:

An electrolytic cell was formed with 200 ml. of a 25 percent by weight solution of ethylene glycol in tap water in which was dissolved 3600 p.p.m. of a N-(substituted phenyl)-2-iminopyrrolidine as electrolyte. The cathode was platinum, and the anode was a metal coupon identified as follows:

Copper—Alloy type ETP or STP; ASTM B 152
Brass—Alloy #8 of ASTM B 36 (66 percent copper+34 percent zinc)
Solder—Alloy grade 30A of ASTM B 32; (50 percent lead+50 percent tin)
Aluminum—Alloy SC 64 C ASTM B 179

The electrolyte solution in which the electrodes were submerged was stirred and heated to 85° C. for a two-hour period while a current of 2 milliamps (at 3 volts) was passed through the cell. After this time, the metal coupons were observed visually to determine the extent of the pitting and fouling of the surfaces. For purposes of comparison, metal coupons were also tested, in a similar manner, in a 25 percent ethylene glycol solution without any additive, as well as in a 25 percent solution of Permaguard ®, a commercially available anti-freeze formulation incorporating highly effective corrosion inhibitors. Table II lists the results of the corrosion tests.

TABLE I

| A | B |
|---|---|
| N-(2-nitrophenyl)-2-imino-pyrrolidine. | N-(2-bromophenyl)-2-imino-pyrrolidine. |
| N-(2,6-dichlorophenyl)-2-iminopyrrolidine. | N-(3-bromophenyl)-2-iminopyrrolidine. |
| Also expected to fall into this category are: | N-(4-bromophenyl)-2-iminopyrrolidine. |
| Other N-(dichlorophenyl)-2-iminopyrrolidines. | N-(3-nitrophenyl)-2-iminopyrrolidine. |
| Combinations of N-(chloro- and iodo or bromo substituted phenyl)-2-iminopyrrolidines. | N-(4-nitrophenyl)-2-iminopyrrolidine. |
| Combinations of N-(halo- and nitrosubstituted phenyl)-2-iminopyrrolidines. | Also expected to fall into this category are: |
| | N-(iodophenyl)-2-iminopyrrolidines. |
| | N-(diiodophenyl)-2-iminopyrrolidines. |
| | N-(dibromophenyl)-2-iminopyrrolidines. |
| | Combinations of N-(iodo- and bromosubstituted phenyl)-2-iminopyrrolidines. |

TABLE II.—CORROSION RESULTS

| Metal | Degree of oxidation[1] with— | | | |
|---|---|---|---|---|
| | No additive | Permaguard ® | A[2] | B[2] |
| Cu | 5 | 2 | 4 | 4 |
| Al | 5 | 4 | 1 | 3 |
| Brass | 5 | 1 | 3 | 4 |
| Solder | 5 | 5 | 3 | 4 |

[1] Degree of oxidation is coded as follows.—1=No visible oxidation; 2=Little oxidation (<10 oxide spots); 3=Moderate oxidation (10-20 oxide spots); 4=Appreciable oxidation (20-50 oxide spots); 5=Covered with oxide.
[2] Compound designation—A=N-(2,6-dichlorophenyl)-2-iminopyrrolidine A representative compound from Group A in Table I; B=N-(3-nitrophenyl), 2-iminopyrrolidine A representative compound from Group B in Table I.

I claim:
1. An N-(substituted phenyl)-2-iminopyrrolidine of the formula

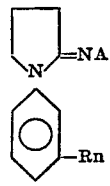

wherein R is an alkyl of 1 to 5 carbon atoms, nitro, Cl, Br or I; n is an integer of 1–2.
2. The compound of claim 1 wherein R is Cl.
3. The compound of claim 1 of the formula

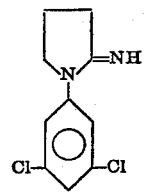

4. The compound of claim 1 wherein R is nitro.
5. The compound of claim 1 of the formula

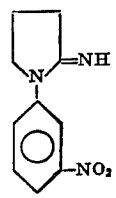

References Cited
UNITED STATES PATENTS
3,632,582  1/1972  Bil _____ 260—247.5 R

JOSEPH A. NARCAVAGE, Primary Examiner

U.S. Cl. X.R.
44—63; 252—390

UNITED STATES PATENT OFFICE
CERTIFICATE OF CORRECTION

Patent No. 3,773,788          Dated November 20, 1973

Inventor(s) Jan H. Vis

It is certified that error appears in the above-identified patent and that said Letters Patent are hereby corrected as shown below:

Column 1: Line 24, "compound" should be --compounds--

Claim 1:  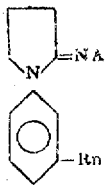   should be   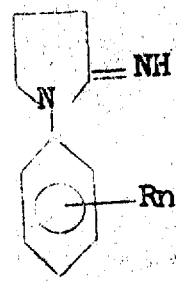

Claim 3:  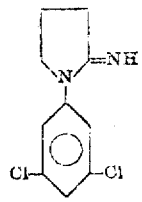   should be   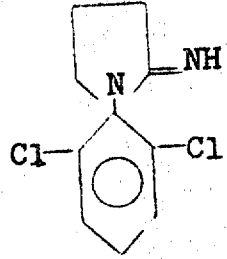

Signed and sealed this 1st day of October 1974.

(SEAL)
Attest:

McCOY M. GIBSON JR.
Attesting Officer

C. MARSHALL DANN
Commissioner of Patents